July 26, 1960 SOZO KAWASAKI 2,946,094
PROCESS OF MAKING OIL-IMPREGNATED MACHINE PARTS
FROM SYNTHETIC RESIN AND THE ARTICLES
MANUFACTURED BY SAID PROCESS
Filed June 11, 1956
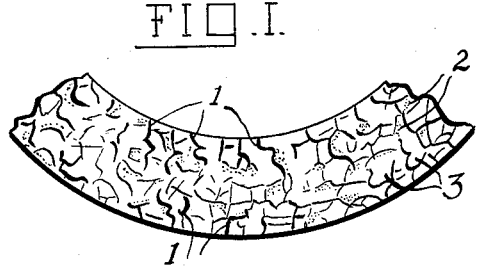
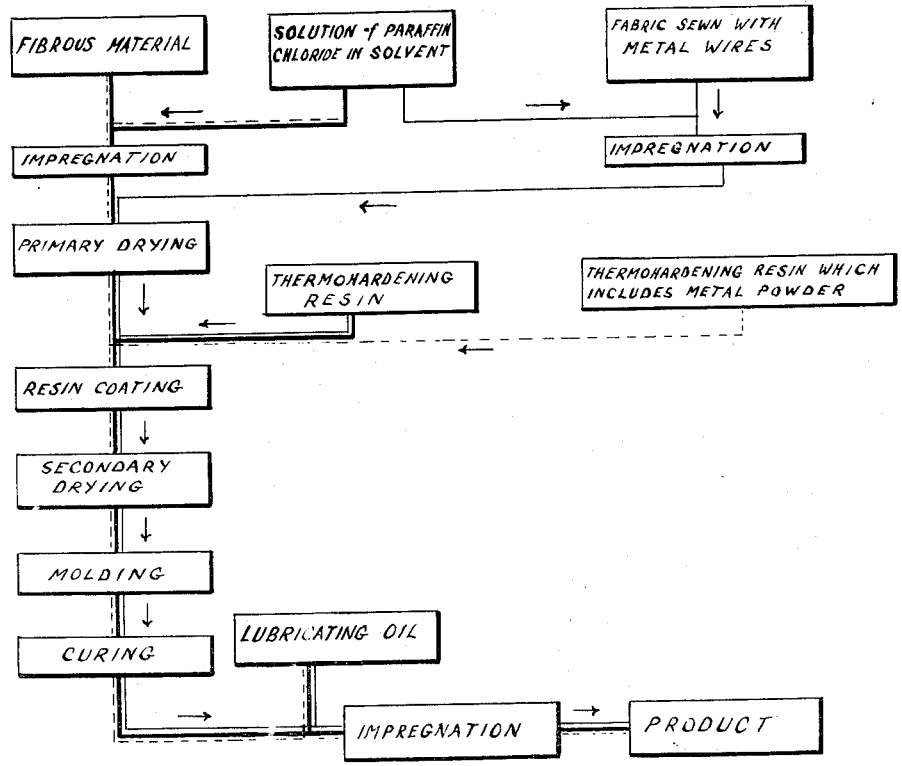
INVENTOR:
SOZO KAWASAKI
BY
Richardson, David and Nordon
ATTORNEYS.

United States Patent Office 2,946,094
Patented July 26, 1960

2,946,094

PROCESS OF MAKING OIL-IMPREGNATED MACHINE PARTS FROM SYNTHETIC RESIN AND THE ARTICLES MANUFACTURED BY SAID PROCESS

Sozo Kawasaki, 10 Shiba Akefunecho, Minatoku, Tokyo, Japan

Filed June 11, 1956, Ser. No. 590,420

6 Claims. (Cl. 18—47.5)

The present invention relates to a process of making oil-impregnated machine parts from a molded body of synthetic resin and also to the articles manufactured by said process and more particularly to the moving parts of machines such as, for example, bearings, gears, cams and the like.

The object of the invention is to provide oil-impregnated machine parts having self-lubricating, excellent wear and rust-proof properties as well as increased noise and shock-absorbing properties.

It is already known that certain synthetic resins, particularly phenolic resin, are suitable for bearing materials. This is based upon the fact that bearings of this type make the use of water as a lubricating agent possible; that they have excellent wear-proof properties, that they have increased noise and vibration-absorbing properties and strong resistance to chemicals such as water, oil, weak acids and aqueous alkaline solutions. These advantages could not be obtained from the conventional metallic bearings. Accordingly, bearings made of synthetic resins have a wide range of application from the severe conditions of high loading and slow speeds such as found in rolling mills to the light conditions of light loading and high speeds such as would be extent in spindle holders in spinning machines.

The fact that synthetic resin is utilized as bearing material is due not only to the superiority of its mechanical and chemical characteristics, but to its ready adaptability to press molding and mass production.

Heretofore, when synthetic resin is used as bearing material, the bearings would be manufactured by a moulding process or manufactured in the form of a body laminated with cloth. Such a bearing would be lubricated with water or oil in the same manner as metal bearings.

According to the present invention the moving parts of machines such as bearings, cams and the like are manufactured by a process in which the molded body of synthetic resin itself is made in porous state and subjected to the treatment of oil impregnation. Several processes for making porous molded body of synthetic resin have already been proposed.

The present inventor, after long research, has come to the conclusion that the most effective method is the utilization of molten paraffin under pressure for making porous such machine parts.

The paraffin-pressure method according to the present invention will be fully explained with reference to the manufacture of bearings.

A fuller understanding of the invention will be apparent from the more detailed description thereof taken in connection with the accompanying drawing wherein:

Fig. 1 is a fragmentary section at right angles to the axis of a bearing manufactured in accordance with this invention, in the stage prior to the final step of impregnating the structure with oil.

Fig. 2 is a flow sheet illustrating the process steps.

In Fig. 1, numeral 1 designates the capillary passages through which the lubricating oil penetrates. Numeral 2 designates fibrous material which is not impregnated with resin as a result of the effect of the paraffin pressure. The residual paraffin chloride therein may be replaced by lubricating oil in the final impregnation step. Numeral 3 designates the fibrous material impregnated with the resin.

60 gr. of some fibrous material such as wood powder or fibers is thoroughly mixed with 10 gr. of graphite powder. This mixture is then put into 30 gr. of molten paraffine, after which it is taken out and cooled, whereupon the fibrous material may be fully impregnated with paraffine. The paraffine-impregnated material thus obtained is mixed with pulverized phenolic resin in a proportion of 70 to 30 by weight. The resulting mixture is then molded to required dimensions under pressure and heating.

In this moulding process, the paraffine melts to a molten state with considerable pressure (hereinafter called "paraffin pressure" which results from squeezing out the paraffin from the fibrous material) against the moulding pressure, so that the resin is prevented from penetrating into the fibrous material. At the same time the graphite powders which have previously been mixed with fibrous material are forced outwardly to the surface of the moulded article to provide a porous structure of resin with minute holes therein. Then the moulded product is immersed in a machine-oil bath at about 100° C., whereby the fibrous materials are impregnated with said machine oil, as the result of which the desired oil-impregnated synthetic resin bearing can be obtained.

In the process described above, graphite powder serves both to provide synthetic resin with porosity and to improve lubrication on sliding surface.

Graphite powder, however, is not always necessary to provide the molded body synthetic resin with porosity. The porosity of synthetic resin may be substantially produced by the pressure of molten paraffin which partially prevents the fibrous structure material from penetrating the resin and at the same time forms a great number of many narrow openings along them in the synthetic resin.

It is needless to say that the wood powders or fibers impregnated with the resin provide increased resilience and elasticity to the resin.

Instead of finely divided fibrous materials, canvas may be used for producing an oil-impregnated synthetic resin article in a laminated form by impregnating pieces of canvas with paraffin, applying thereto a synthetic resin solution, piling the pieces in layers and pressing such pile under heat.

It has been found, however, that oil-impregnated synthetic resin articles made in the manner as mentioned above have two disadvantages, one of which is that after applying resin, the canvas must be subjected to a drying process at least 80° C. and in such case high temperature treatment above 60° C. cannot be applied, since the melting point of ordinary paraffin is between 50° C. and 60° C. and therefore care must be taken that the drying is attained at a lower temperature and for a longer period. Another disadvantage is based upon the low thermal conductivity common to usual synthetic resin bearings. That is to say, under high load and high speed performance, a frictional heat would be accumulated at the sliding or bearing surface, accompanied by a bad influence on the synthetic resin itself and also on the lubrication oil utilized therewith.

According to the present invention, the aforesaid disadvantages may be eliminated by employing, in place of usual paraffin, paraffin chloride having a higher melting point (120° C.) and by mixing metal powders or metallic wires in the synthetic resin or its filler to get better thermal conductivity. This will be now illustrated by way of example as follows:

A fuller understanding of the invention will be apparent from the following examples taken in connection with the accompanying drawing, wherein:

Fig. 1 is a fragmentary section taken at right angles to the axis of a bearing manufactured in accordance with the invention but prior to the final impregnation with oil.

Fig. 2 is a flow sheet showing the process steps.

In Fig. 1 the numeral 1 designates the capillary passages through which lubricating oil will penetrate. The numeral 2 designates the fibrous material which is not impregnated with the resin in consequence of the "paraffin pressure." The numeral 3 designates the fibrous material which is impregnated with the resin.

In accordance with the invention herein, the oil-impregnated cotton machine parts may be associated with materials having a high thermal conductivity such as copper, which may be in the form of wire or powder. When using copper wire, which may be #30, the wire may be sewn on a surface of the fabric. When using copper powder, said powder may be preferably incorporated with thermohardening resin.

Then, 1 kg. of such cotton cloths is immersed in and impregnated with a solution of 250 gr. of 70% solid paraffin chloride in 1 kg. of gasoline. The cloths so treated are kept in a drying chamber at a temperature of 40–45° C. for about 20 minutes to rid the same of volatile elements, whereupon solid paraffin chloride remains in the cloths. In the case of copper powder being used, said powder is only put in the paraffine chloride solution.

The cloths to which copper wire has been added is spread with 1.5 gr. of phenolic resin solution (which is obtained by dissolving the primary condensation product of phenolic resin in a solvent, the alcohol and resin content of which is 70%) and dried in a drying chamber at a temperature of 85°–90° C. for 20 minutes. The required number of the cloths thus treated is then piled one upon another and moulded at a temperature of 140° C.–150° C. and a pressure of 250–300 kg./cm.$^2$ to produce porous laminated elements including phenolic resin.

During the molding of the resin-paraffin chloride bearing cloths, paraffin chloride melts out by pressure and heat. Due to the paraffin pressure the cloths are partially prevented from impregnation with resin, whereby along the fibrous materials a great number of capillary passages are formed and could be filled by lubricating oil in the next impregnation step.

The resultant resin carrying porous material is subjected to an impregnation-treatment with ordinary lubricating oil, whereupon the desired oil impregnated synthetic resin products may be obtained.

In the foregoing example the fibrous material is impregnated with phenolic resin. However, according to the invention any thermohardening resin such as for example, urea-resin, melamin-resin and the like may be used to produce similar desirable products. As a heat-conductive material, in addition to copper, aluminum and brass may be used. Further molybdenum disulfide and metal oxides such as lead oxide are also available. The metal oxides are useful for lubrication in addition to their heat-conductivity.

At light load operation, the metals or metal oxides are not always necessary, since in such operation the heat-conductivity is not a factor.

While the invention has been explained with reference to laminated material, wood powders or cotton chips may be used with the resin to produce the same result.

The materials according to the invention may be used to manufacture bearings, gears, cams and the like machine parts.

It is, of course, to be understood that the foregoing description is illustrative only and that numerous changes may be made in the specific embodiments described without departing from the scope of the invention as defined in the appended claims.

What is claimed is:

1. The process of manufacturing oil-impregnated machine parts from thermohardening synthetic resin which comprises first impregnating a fibrous material with a solution of paraffin chloride in a solvent, drying the impregnated material to remove the solvent, next applying a thermo-hardening synthetic resin to said impregnated fibrous material, next drying and molding under heat and pressure the material to which the resin has been applied to provide a porous structure having minute holes therein, and finally immersing said molded material in a bath of lubricating oil to impregnate the same with said oil.

2. The process of making oil impregnated machine parts comprising impregnating fibrous material with paraffin chloride, said fibrous material having uniformly distributed therethrough a solid material of high thermal conductivity, applying a thermohardening synthetic resin to the impregnated fibrous material, molding the resin-paraffin bearing fibrous material under heat and pressure to melt the paraffin content thereof and to cause the melted paraffin to flow producing a porous structure having capillary passages in the molded product, and impregnating the porous molded product in lubricating oil.

3. The process of claim 2, wherein said material of high thermal conductivity is metal wire.

4. The process of claim 2, wherein the material of high thermal conductivity is a metal powder.

5. The process of making oil-impregnated machine parts comprising impregnating fibrous material with paraffin chloride, said fibrous material having uniformly combined therewith metal wire of high thermal conductivity, applying a thermohardening synthetic resin to the impregnated fibrous material, molding the resin-paraffin bearing fibrous material under heat and pressure to melt the paraffin content thereof and to cause the melted paraffin to flow producing a porous structure having capillary passages in the molded product, and impregnating the porous molded product with lubricating oil.

6. The process of making oil-impregnated machine parts comprising impregnating fibrous material with paraffin chloride, applying a thermohardening synthetic resin in which is incorporated metal powder to the impregnated fibrous material under heat and pressure to melt the paraffin content thereof and to cause the melted paraffin to flow producing a porous structure having capillary passages in the molded product, and impregnating the porous molded product with lubricating oil.

References Cited in the file of this patent

UNITED STATES PATENTS

| | | |
|---|---|---|
| 1,409,148 | Apple | Mar. 14, 1922 |
| 1,964,202 | Hooper | June 26, 1934 |
| 2,367,275 | Haney et al. | Jan. 16, 1945 |
| 2,672,443 | Screnock | Mar. 16, 1954 |
| 2,695,426 | Weyerhauser | Nov. 30, 1954 |
| 2,757,109 | Martello | July 31, 1956 |
| 2,772,930 | Schubert et al. | Dec. 4, 1956 |
| 2,776,175 | Waite | Jan. 1, 1957 |